United States Patent
Kolb et al.

(10) Patent No.: US 10,861,262 B2
(45) Date of Patent: Dec. 8, 2020

(54) HANDHELD TRANSMITTER FOR A PORTABLE LOCK

(71) Applicant: ABUS August Bremicker Soehne KG, Wetter-Volmarstein (DE)

(72) Inventors: Marcus Kolb, Girod (DE); Marvin Mueller, Salz (DE)

(73) Assignee: ABUS August Bremicker Soehne KG, Wetter-Volmarstein (DE)

( * ) Notice: Subject to any disclaimer, the term of this patent is extended or adjusted under 35 U.S.C. 154(b) by 0 days.

(21) Appl. No.: 16/405,839

(22) Filed: May 7, 2019

(65) Prior Publication Data
US 2019/0347881 A1 Nov. 14, 2019

(30) Foreign Application Priority Data

May 11, 2018 (DE) .......... 10 2018 111 286

(51) Int. Cl.
*G07C 9/00* (2020.01)
*E05B 47/00* (2006.01)
*G08C 17/02* (2006.01)

(52) U.S. Cl.
CPC ...... *G07C 9/00182* (2013.01); *E05B 47/0001* (2013.01); *G08C 17/02* (2013.01);
(Continued)

(58) Field of Classification Search
CPC ............ G07C 9/00182; G07C 9/00309; G08C 2201/32; E05B 67/003
(Continued)

(56) References Cited

U.S. PATENT DOCUMENTS

| 10,428,557 | B2 * | 10/2019 | Niroomand | ............. E05B 67/36 |
| 2010/0123664 | A1 * | 5/2010 | Shin | ....................... G06F 1/1626 |
| | | | | 345/169 |

(Continued)

FOREIGN PATENT DOCUMENTS

| DE | 20 2010 010 892 U1 | 1/2012 |
| DE | 10 2011 001 226 A1 | 9/2012 |

(Continued)

OTHER PUBLICATIONS

German Search Report dated Mar. 11, 2019 in corresponding German patent application No. 10 2018 111 286.6 (seven pages).

*Primary Examiner* — Vernal U Brown
(74) *Attorney, Agent, or Firm* — Kilpatrick Townsend & Stockton LLP

(57) ABSTRACT

The invention relates to a handheld transmitter having an energy store, a motion sensor for detecting a movement of the handheld transmitter, and a transmission/reception unit for establishing a wireless connection to an electrically actuable portable lock, wherein the handheld transmitter can be switched over between a manual mode in which the connection establishment can only be triggered by the actuation of an actuation element by a user and an automatic mode in which the connection establishment can be triggered by a movement of the handheld transmitter. A further subject of the invention is a locking system comprising such a handheld transmitter and an electrically actuable portable lock. The invention additionally relates to a method of unlocking an electrically actuable portable lock by means of a handheld transmitter.

18 Claims, 1 Drawing Sheet

(52) U.S. Cl.
CPC .............. *G07C 2009/00206* (2013.01); *G08C 2201/32* (2013.01)

(58) Field of Classification Search
USPC ........................................................ 340/5.62
See application file for complete search history.

(56) References Cited

U.S. PATENT DOCUMENTS

| 2010/0174501 A1* | 7/2010 | Myadam | H04W 8/24 |
| | | | 702/63 |
| 2013/0154926 A1* | 6/2013 | Kim | G06F 9/00 |
| | | | 345/157 |

FOREIGN PATENT DOCUMENTS

| JP | 2012-046985 A | 3/2012 |
| WO | 2013/078561 A1 | 6/2013 |

* cited by examiner

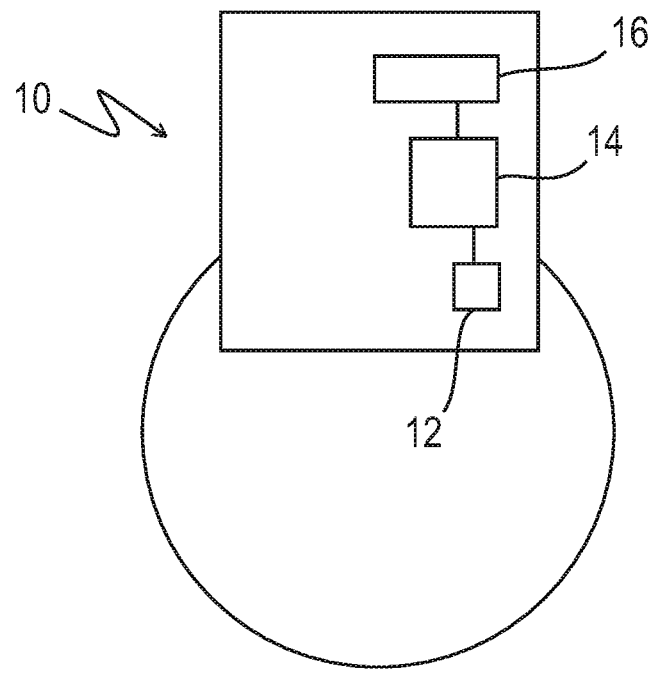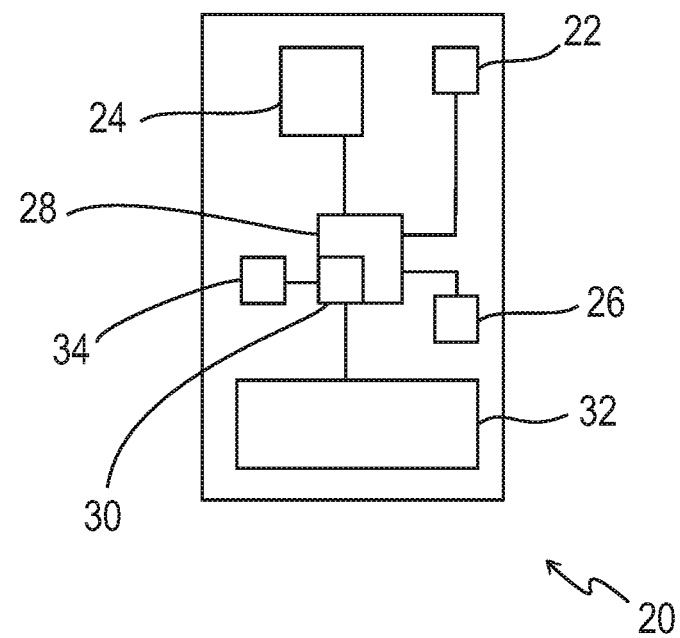

HANDHELD TRANSMITTER FOR A PORTABLE LOCK

This application claims priority to German Patent Application No. 102018111286.6, filed May 11, 2018, the disclosure of which is incorporated by reference herein.

The present invention relates to a handheld transmitter for unlocking an electrically actuable portable lock.

A portable lock is understood in this context as every kind of lock that is not installed in a stationary manner in a building or in a motor vehicle, but can rather be removed from an object to be locked such as a padlock, a hoop lock, a cable lock, or a brake disk lock. Portable locks in this context furthermore also include frame locks or battery compartment locks that are attached to two-wheelers or to three-wheelers, in particular to bicycles. Such portable locks are generally known.

A portable lock that does not have a lock cylinder, but is instead unlocked, and optionally also locked again, by means of an electric motor is called electrically actuable. Many users desire the possibility of controlling the portable lock by means of a smartphone, a smartwatch, or the like that they anyway take along with them. There is nevertheless also a potential customer group that has neither a smartphone nor a smartwatch and that should nevertheless not be excluded from a use of the electrically actuable portable lock.

It is therefore the underlying object of the invention to make the use of an electrically actuable portable lock more comfortable even without the use of a smartphone or of a smartwatch.

This object is satisfied by a handheld transmitter.

The handheld transmitter in accordance with the invention comprises an energy store, a motion sensor for detecting a movement of the handheld transmitter, and a transmission/reception unit for establishing a wireless connection to an electrically actuable portable lock. In addition, the handheld transmitter can be switched between a manual mode in which the connection establishment can only be triggered by the actuation of an actuation element by a user and an automatic mode in which the connection establishment can be triggered by a movement of the handheld transmitter.

It is the general idea underlying the invention so-to-say to provide a remote control with the handheld transmitter that enables, for example as an alternative to a smartphone or a smartwatch, a control of the lock, i.e. an unlocking and optionally also a locking, from a certain distance. Depending on the personal preference of the user, he can operate the handheld transmitter in a manual mode in which the user consciously has to actuate an actuation element, for example a push button, in particular a press button or a slide button, to effect an unlocking of the lock. Or the user switches the handheld transmitter into an automatic mode in which an unlocking procedure is initiated in a manner unnoticed by the user, so-to-say runs in the background, when the handheld transmitter was moved. A movement sufficient for the connection establishment and for the unlocking procedure can already be present, for example, when the user carries the handheld transmitter in his pants pocket and approaches the lock. However, a lower detection sensitivity of the motion sensor is also generally conceivable that can, for example, require the user to move the handheld transmitter in a more pronounced manner, for example by a stronger shaking or knocking, for the triggering of the connection establishment and unlocking procedure.

As soon as the wireless connection between the handheld transmitter and the lock has been established, the handheld transmitter and the lock can exchange data. The data transmitted to the lock by the handheld transmitter can in particular comprise a virtual key and/or a device identifier with whose aid the user taking along the handheld transmitter can authenticate himself with regard to the lock. If the corresponding user authentication has been successfully passed on the part of the lock, the lock can carry out an unlocking procedure. It is understood that a locking of the lock is generally also possible in the same manner.

In the case of a triggering of the connection establishment by actuating the actuation element, the data transmitted to the lock by the handheld transmitter can additionally comprise an activation signal to wake up a lock that has moved into an energy-saving dormant state for the connection establishment and for the user authentication.

Advantageous embodiments of the invention can be seen from the dependent claims, from the description and from the drawing.

In accordance with an embodiment, a switchover element is provided for switching over between the manual mode and the automatic mode. The switchover element is in this respect advantageously formed by the actuation element. The switchover from the manual mode into the automatic mode can thus be effectable by an actuation of the actuation element for a first predefined period of time. Accordingly, the switchover from the automatic mode into the manual mode can also be effectable by an actuation of the actuation element for a second predefined period of time. The first and second predefined periods of time are preferably each in the range from 5 seconds to 15 seconds. In other words, the first and second predefined periods of time for which the actuation element has to be actuated to switch over between the operating modes last beyond a period that is typically required for the actuation of an actuation element, for example pressing a push button, i.e. a conscious action is required for the switching over between the operating modes. This ultimately contributes to avoiding an accidental switchover.

For reasons of simplicity, the first and second predefined periods of time can be equal.

In accordance with a further embodiment, the handheld transmitter comprises a querying means for querying the charge state of the energy store. Such a querying means makes it possible to query the charge state of the energy store on a desired switchover from the manual mode into the automatic mode and to prevent a switchover into the automatic mode in the case of an insufficient charge state. Since any movement detected by the motion sensor in the automatic mode can trigger a connection establishment, i.e., that is can activate the transmission/reception unit, a handheld transmitter taken along by a user will as a rule use considerably more energy in the automatic mode than in the manual mode. Since a switchover into the automatic mode is prevented in the case of an insufficient charge state, the energy store can be conserved and it is ideally prevented that sufficient energy is no longer available on an energy desire of the user to establish a connection to the lock and to trigger an unlocking procedure.

A querying of the charge state of the energy store and, in the case of an insufficient charge state, a switchover into the manual model is accordingly preferably provided on detection of a movement of the handheld transmitter in the automatic mode, in particular without a connection to the lock being established. The autonomous switchover into the manual mode in the case of an insufficient charge state likewise contributes to a saving of the energy store and ideally prevents sufficient energy to establish a connection and to trigger an unlocking procedure from no longer being available on an unlocking desire of the user.

In accordance with a further embodiment, the establishing of a connection to the lock can also be triggered in the automatic mode by an actuation of the actuation element.

In the manual mode, and optionally also in the automatic mode, the connection establishment can be effectable by an actuation of the actuation element for a third predefined period of time. The third predefined period of time is advantageously shorter than a first or second predefined period of time for which the actuation element has to be actuated to switch over between the manual mode and the automatic mode. The third predefined period of time is thus preferably in the range from 20 ms to 2 s.

To conserve the energy store, a querying of the charge state of the energy store and, in the event of an insufficient charge state, a switchover into the manual mode are also provided on an actuation of the actuation element for the third predefined period of time in the automatic mode, in particular without a connection to the lock being established.

It is understood that to conserve the energy store, the manual mode is advantageously the ex-works setting of the handheld transmitter, i.e. the handheld transmitter is delivered in the manual mode and is, where necessary, only switched over to the automatic mode by the user.

So that the user of the handheld transmitter can replace or recharge it in good time, the handheld transmitter in accordance with a further advantageous embodiment has an output means for outputting a visual and/or acoustic signal in the event of an insufficient charge state.

The connection between the handheld transmitter and the lock preferably takes place in accordance with the Bluetooth standard since this has proven itself on the basis of its range and universality.

A further subject of the invention is a locking system comprising a handheld transmitter of the above-described kind and an electrically actuable portable lock that has a transmission/reception unit that enables the establishment of a wireless connection between the lock and the handheld transmitter. The advantages explained above can be achieved accordingly by the locking system.

The subject of the invention is additionally a method with whose aid the above-explained advantages can likewise be achieved.

The invention will be described in the following purely by way of example with reference to a possible embodiment and to the enclosed drawing.

FIG. 1 shows a schematic representation of a locking system in accordance with the invention.

The locking system shown in FIG. 1 comprises an electrically actuable portable lock 10, here in the form of a frame lock, that is installed at a bicycle, not shown.

The lock 10 has a Bluetooth-enabled transmission/reception unit 12 and an authentication module 14 connected thereto to authenticate a user of the lock 10 and an electric motor 16 connected to the authentication module 14 to unlock the lock 10 in the event of a successful user authentication.

A handheld transmitter 20 that the user of the lock 10 can carry along with him and that serves for the control of the lock 10 from a distance is associated with the lock 10. The handheld transmitter 20 in turn has a Bluetooth-enabled transmission/reception unit 22 for this purpose as well as an actuation element 24 actuable by the user, a motion sensor 26 for detecting a movement of the handheld transmitter 20, and a control unit 28 connected to the transmission/reception unit 22, to the actuation element 24, and to the motion sensor 26. The control unit 28 comprises a querying means 30 to query the charge state of an energy store 32 of the handheld transmitter 20 which can be a battery respectively a rechargeable battery. For the event that the queried charge state of the energy store 32 is below a predefined threshold value, an output means 34 is provided to output a visual and/or acoustic warning signal to the user.

The handheld transmitter 20 can selectively be operated in a manual mode or in an automatic mode, with the manual mode being the works setting.

In the manual mode, the user has to actuate the actuation element 24 to unlock the lock 10, i.e. has to press the push button, and indeed for a brief period of time that is in the range from 20 ms to 2 s.

This brief actuation of the actuation element 24 initiates the querying of the charge state of the energy store 32 by the querying means 30 and optionally the output of a visual and/or acoustic warning signal by the output means 34. The transmission/reception unit 22 of the handheld transmitter 20 is furthermore caused by the brief actuation of the actuation element 24 to establish a Bluetooth connection to the transmission/reception unit 12 of the lock 10. As soon as the Bluetooth connection between the handheld transmitter 20 and the lock 10 has been established, the authentication module 14 of the lock 10 carries out an authentication of the handheld transmitter 20 and thus of the user and if the user authentication is successful, the lock 10 is unlocked.

To switch over the handheld transmitter 20 into the automatic mode, the user has to actuate the actuation element 24 for a longer time, i.e. therefore has to hold the press button depressed for a longer time, with this longer time, for example, being able to be in the range from 5 s to 15 s. This actuation of the actuation element 24 results in a querying of the charge state of the energy store 32 by the querying means 30. If the queried charge state of the energy store 32 is below a predefined threshold value, a switchover into the automatic mode is prevented, i.e. the handheld transmitter 20 remains in the manual mode. If the energy store 32 in contrast has sufficient energy, the handheld transmitter 20 switches over into the automatic mode.

In the automatic mode, every movement of the handheld transmitter 20 detected by the motion sensor 26 results in a querying of the charge state of the energy store 32 by the querying means 30. It is understood that the detection sensitivity of the motion sensor 26 is set such that unnecessary querying procedures of the charge state of the energy store 32 are avoided, i.e. ideally, only relevant movements of the handheld transmitter 20 should result in a querying of the charge state, for example movements that occur when the user carries the handheld transmitter 20 in his pants pocket and approaches the lock 10.

If the querying means 30 determines that the energy store 32 has sufficient energy, the transmission/reception unit 22 of the handheld transmitter 20 is caused to establish a Bluetooth connection to the transmission/reception unit 12 of the lock 10 so that the authentication module 14 of the lock 10 can authenticate the handheld transmitter 20 as already described above and can unlock the lock 10 in the event of a successful authentication.

If, in contrast, the query means 30 determines that the queried charge state of the energy store 32 is below a predefined threshold value, the handheld transmitter 20 switches over into the manual mode to conserve the energy store 32 without a Bluetooth connection to the lock 10 being established. The user now therefore has to briefly actuate the actuation element as described above for the unlocking of the lock 10.

The user can also deliberately command an unlocking of the lock 10 in the automatic mode in that he actuates the actuation element 24 for the already mentioned brief period of time. The querying means 30 also first queries the charge state of the energy store 32 in this case. If sufficient energy is present, the transmission/reception unit 22 of the handheld transmitter 20 is caused to establish a Bluetooth connection to the transmission/reception unit 12 of the lock 10 so that the authentication module 14 of the lock 10 can authenticate the handheld transmitter 20 and thus the user and can unlock the lock 10 on a successful user authentication.

If, in contrast, the querying means 30 determines that the queried charge state of the energy store 32 is below a predetermined threshold value, the output means 34 outputs a visual and/or acoustic warning signal to the user and the handheld transmitter 20 switches over into the manual mode without a Bluetooth connection to the lock 10 being established. For an unlocking of the lock 10, the user therefore again has to briefly actuate the actuation element 24 in this case as soon as the handheld transmitter 20 has adopted its manual mode.

REFERENCE NUMERAL LIST 10 lock
12 transmission/reception unit
14 authentication module
16 electric motor
20 handheld transmitter
22 transmission/reception unit
24 actuation element
26 motion sensor
28 control unit
30 querying means
32 energy store
34 output means

The invention claimed is:

1. A handheld transmitter having:
an energy store,
a motion sensor for detecting a movement of the handheld transmitter,
a transmission/reception unit for establishing a wireless connection to an electrically actuable portable lock, wherein the handheld transmitter can be switched over between a manual mode in which the connection establishment can only be triggered by an actuation of an actuation element by a user and an automatic mode in which the connection establishment can be triggered by a movement of the handheld transmitter; and
a querying means for querying a charge state of the energy store, wherein a querying of the charge state of the energy store is provided on a desired switchover from the manual mode into the automatic mode; and wherein a switchover into the automatic mode is prevented in the case of an insufficient charge state.

2. The handheld transmitter in accordance with claim 1, further comprising a switchover element for switching over between the manual mode and the automatic mode.

3. The handheld transmitter in accordance with claim 2, wherein the switchover element is formed by the actuation element.

4. The handheld transmitter in accordance with claim 2, wherein the switchover from the manual mode into the automatic mode is effectable by an actuation of the actuation element for a first predefined period of time.

5. The handheld transmitter in accordance with claim 4, wherein the switchover from the automatic mode into the manual mode is effectable by an actuation of the actuation element for a second predefined period of time.

6. The handheld transmitter in accordance with claim 5, wherein the first and second predefined periods of time are each in the range from 5 s to 15 s.

7. The handheld transmitter in accordance with claim 1, further comprising an output means for outputting a visual and/or acoustic signal in an event of an insufficient charge state.

8. The handheld transmitter in accordance with claim 1, wherein a querying of the charge state of the energy store and, in the case of an insufficient charge state, a switchover into the manual model is provided on detection of a movement of the handheld transmitter in the automatic mode.

9. The handheld transmitter in accordance with claim 1, wherein the establishment of a connection to the lock can also be triggered in the automatic mode by an actuation of the actuation element.

10. The handheld transmitter in accordance with claim 9, wherein the connection establishment is effectable by an actuation of the actuation element for a third predefined period of time.

11. The handheld transmitter in accordance with claim 10, wherein the third period of time is smaller than a first or second predefined period of time for which the actuation element has to be actuated to switch over between the manual mode and the automatic mode.

12. The handheld transmitter in accordance with claim 10, wherein the third predefined period of time is in the range from 20 ms to 2 s.

13. The handheld transmitter in accordance with claim 10, wherein, on an actuation of the actuation element for the third predefined period of time in an automatic mode, a querying of the charge state of the energy store is provided and, in an event of an insufficient charge state, a switchover is made into the manual mode.

14. The handheld transmitter in accordance with claim 1, wherein the connection is a Bluetooth connection.

15. The handheld transmitter in accordance with claim 1, wherein the actuation element is a push button.

16. The handheld transmitter in accordance with claim 15, wherein the push button is one of a press button and a slide button.

17. A locking system comprising
a handheld transmitter and an electrically actuable mobile lock,
the handheld transmitter having:
an energy store,
a motion sensor for detecting a movement of the handheld transmitter,
a transmission/reception unit for establishing a wireless connection to an electrically actuable portable lock, wherein the handheld transmitter can be switched over between a manual mode in which the connection establishment can only be triggered by an actuation of an actuation element by a user and an automatic mode in which the connection establishment can be triggered by a movement of the handheld transmitter; and
a querying means for querying a charge state of the energy store, wherein a querying of the charge state of the energy store is provided on a desired switchover from the manual mode into the automatic mode, and wherein a switchover into the automatic mode is prevented in the case of an insufficient charge state; and the electrically actuable mobile lock having a transmission/reception unit that enables the establishment of a wireless connection between the lock and the handheld transmitter.

18. A method of unlocking an electrically actuable portable lock by means of a handheld transmitter, in which method the handheld transmitter is switched into a manual mode in which an establishment of a wireless connection between the handheld transmitter and the lock is triggered by an actuation of an actuation element of the handheld transmitter by a user; or the handheld transmitter is switched into an automatic mode in which the establishment of a wireless connection between the handheld transmitter and the lock is triggered by a detection of a movement of the handheld transmitter by a motion sensor of the handheld transmitter; and wherein the handheld transmitter has an energy store with a charge state that is provided by a querying means on a desired switchover from the manual mode into the automatic mode and to prevent a switchover in the event of insufficient charge.

* * * * *